Feb. 14, 1939. A. P. FERGUESON 2,147,020
TIRE COVER
Filed Oct. 14, 1932 4 Sheets-Sheet 1
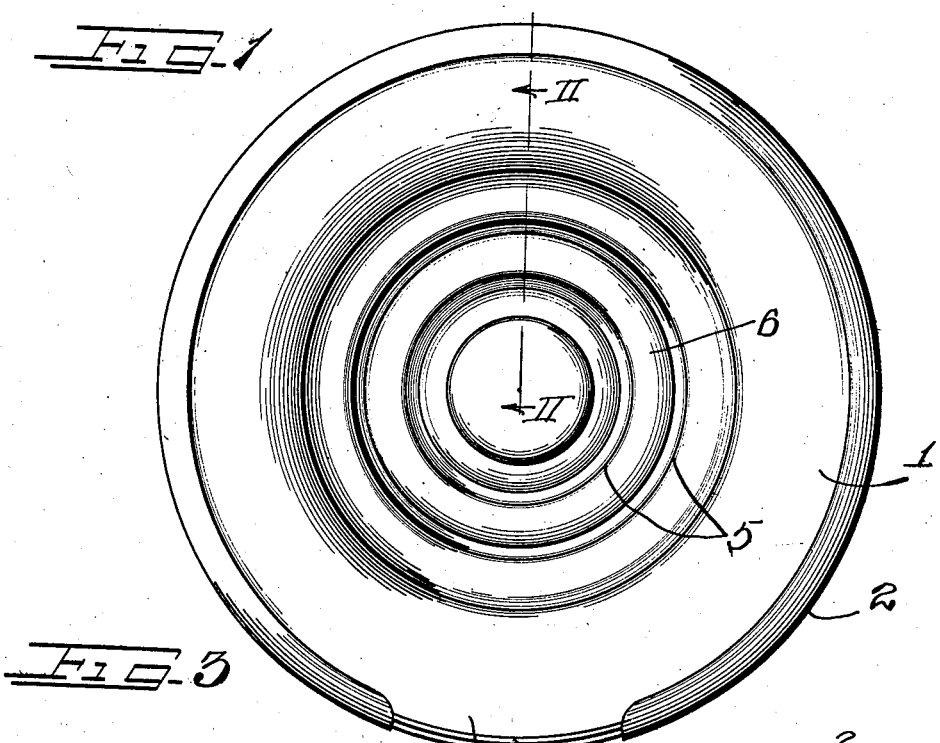
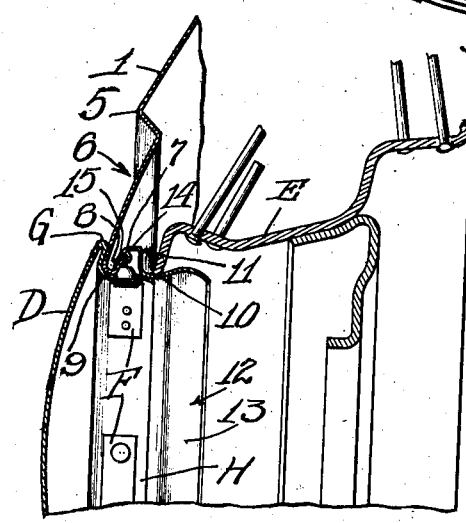
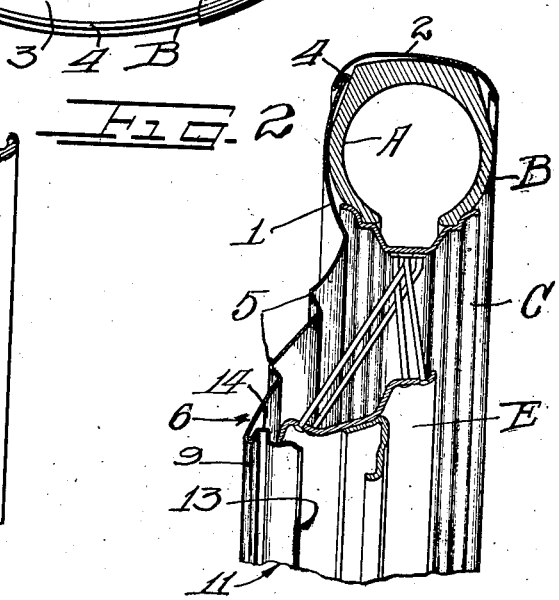
Inventor
Arthur P. Fergueson.

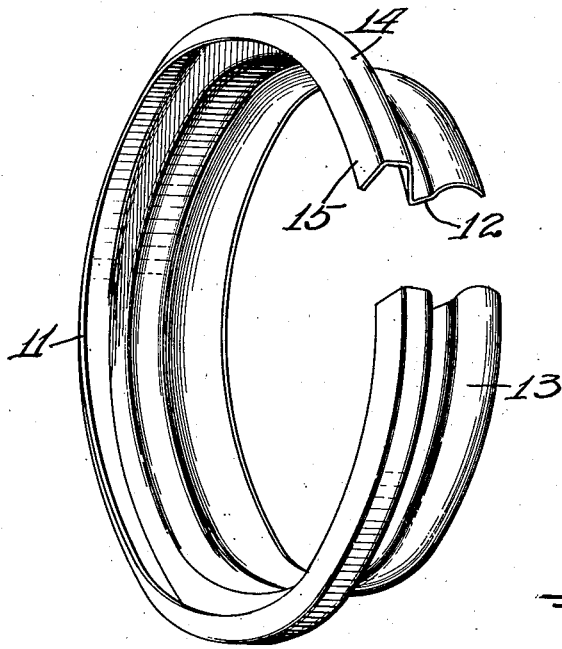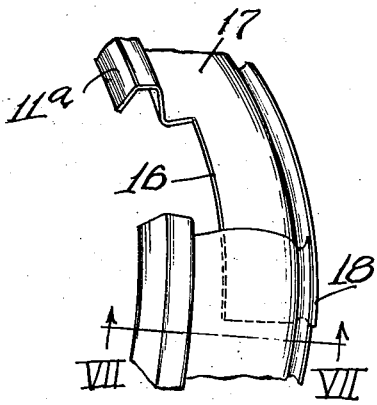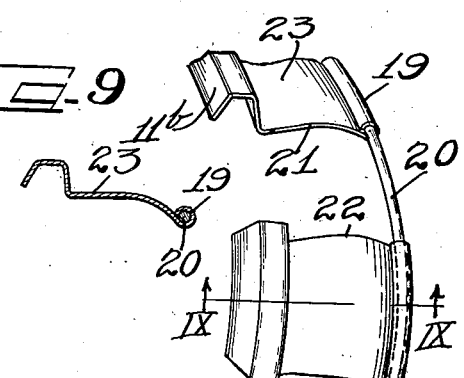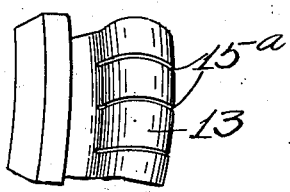

Feb. 14, 1939.   A. P. FERGUESON   2,147,020
TIRE COVER
Filed Oct. 14, 1932   4 Sheets-Sheet 3
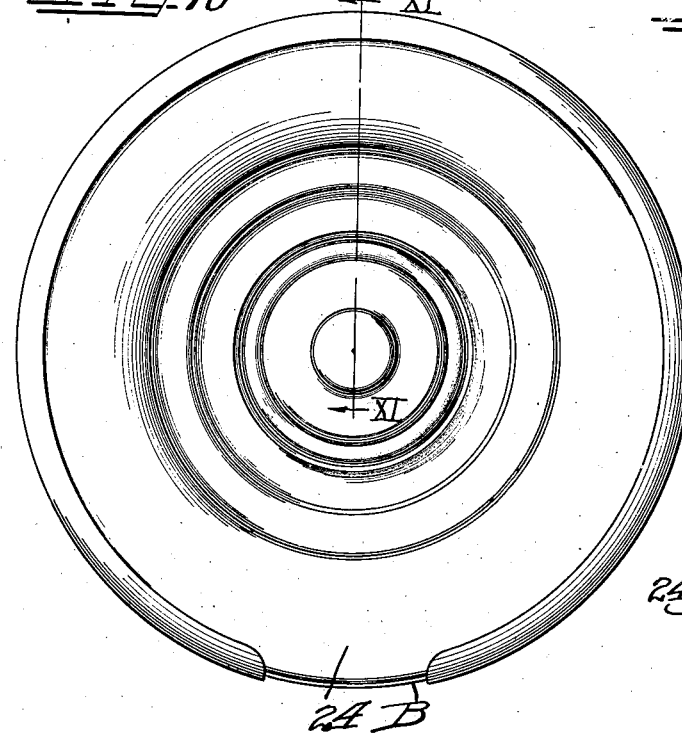
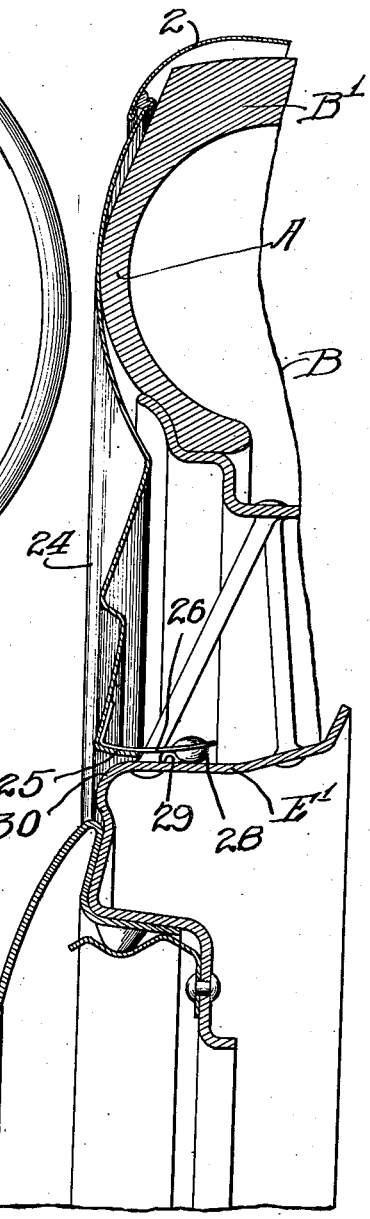
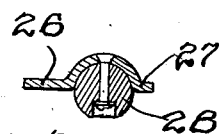
Inventor
Arthur P. Fergueson

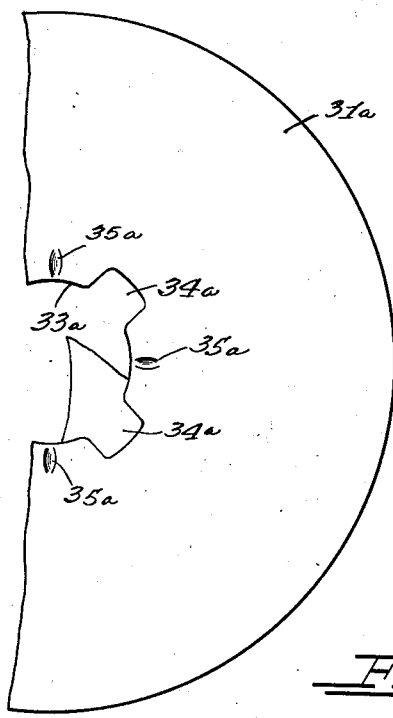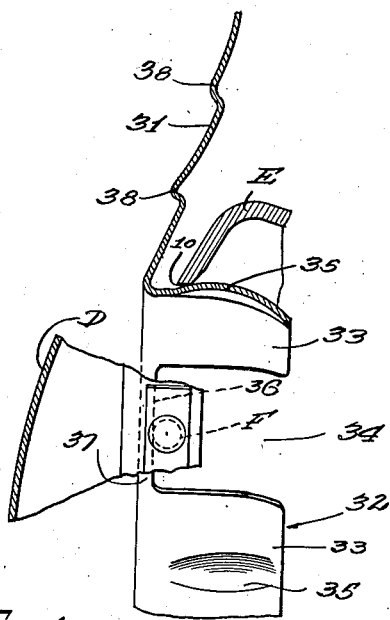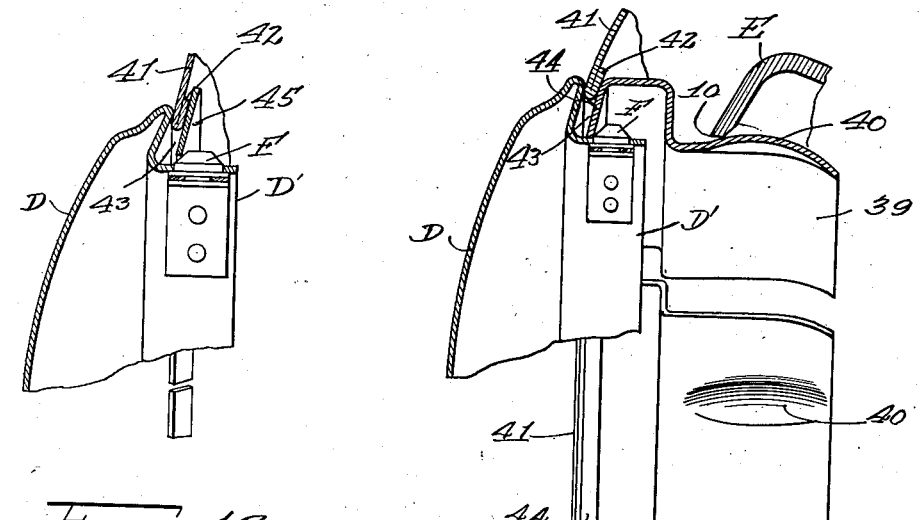

Patented Feb. 14, 1939

2,147,020

UNITED STATES PATENT OFFICE 2,147,020

TIRE COVER

Arthur P. Fergueson, Detroit, Mich., assignor, by mesne assignments, to Houdaille-Hershey Corporation, Detroit, Mich., a corporation of Michigan Application October 14, 1932, Serial No. 637,688

9 Claims. (Cl. 150—54)

This invention has to do with tire covers of the character embodying a side plate for covering the outer side wall of a spare tire.

It is an object of this invention to provide means for centering and supporting a tire cover side plate in proper protecting relation to a spare tire.

It is another object of this invention to provide a cover for substantially the entire side of a wheel from the hub outward.

It is another object of the invention to provide a tire cover side plate for covering the major portion of a spare wheel and tire mounted thereon, together with means for supporting and centering the plate with respect to the wheel.

A further object of the invention resides in the provision of a tire cover side plate with means whereby said plate may be readily applied to and removed from a spare wheel.

A further object of the invention resides in a side plate having yieldable holding means for supporting the same on a spare wheel.

A still further object of the invention includes the provision of a tire cover side plate having means whereby the same may be detachably interlocked with the hub cap of a spare wheel, whereby both plate and hub cap may be applied to and removed from a spare wheel and tire with no more effort than normally required in applying and removing the hub cap alone.

Another object of the invention resides in the provision of an adapter for use with the side plate for detachably interlocking the side plate with the spare wheel hub, whereby the same side plate may be applied to spare wheels having different sized hub openings.

The invention is susceptible of being carried out in various forms. In accordance with one form, the side plate is provided with a central opening of a diameter substantially equal to that of the hub, and is connected to a continuous or a split ring. The ring, when split, is preferably sprung into connected relation to the plate and is formed with a peripherally bulged skirt arranged to be snapped axially into the hub opening provided for the hub cap, thereby supporting and centering the side plate on the hub of the spare wheel. The side plate and ring together provide a peripheral internal groove into which the spring elements of the hub cap snap when the hub cap is applied to the side plate in essentially the same manner in which it is applied to the hub.

In accordance with another form of the invention, the side plate is formed with spring fingers arranged to resiliently engage the wheel hub to thereby center and detachably support the side plate on the spare wheel. This form of the invention is susceptible of use in connection with any spare wheel, including one whose hub is such that it is not practicable to remove the hub cap therefrom and insert it in the tire cover plate, as is the case with the above described form of the invention.

This invention is particularly adapted for use in connection with a tire cover rim or ring which is employed for covering the tread portion of a tire and which cooperates with the side plate to substantially entirely close the tread and exposed side wall of a spare tire, although it may be used to advantage with a cover of the one piece type for covering both of said parts of the tire. This construction is also advantageous where the rear bumper is positioned rather close to the spare tire, since it permits of the tire cover ring's being readily removed without the need of paying attention to the side plate, the latter being held in position independently of the ring.

Other and further important objects of this invention will be apparent from the disclosures in the specification and the accompanying drawings.

This invention (in preferred forms) is illustrated in the drawings and hereinafter more fully described.

Figure 1 is an elevational view of one form of the invention applied to a spare wheel and tire.

Figure 2 is an enlarged fragmentary sectional view taken approximately in the plane indicated by the line II—II in Figure 1.

Figure 3 is a fragmentary enlarged view of the lower portion of Figure 2.

Figure 4 is a perspective view of one form of adapter or centering collar for the tire cover of the invention.

Figures 5, 6, 7, 8 and 9 are views of modified forms of centering collar, Figure 7 being taken approximately in the plane indicated by the line VII—VII in Figure 6, and Figure 9 being taken approximately in the plane indicated by the line IX—IX in Figure 8.

Figure 10 is an elevational view of another form of the invention applied to a spare wheel and tire.

Figure 11 is an enlarged fragmentary sectional view taken approximately in the plane indicated by the lines XI—XI in Figure 10.

Figure 12 is an enlarged perspective view showing the releasable holding means in detail.

Figure 13 is a fragmentary sectional view taken approximately in the plane indicated by the line XIII—XIII in Figure 12.

Figure 14 is a fragmentary view of another modification in an incomplete stage of its manufacture.

Figure 15 is an enlarged fragmentary sectional view of the construction appearing in Figure 14 in completed shape, and cooperating hub and hub cap parts.

Figure 16 is a fragmentary sectional view similar to Figure 15 but showing a still further modified form of the invention.

Figure 17 is a fragmentary sectional view showing a still further form of the invention.

Referring now more particularly to the drawings, the tire cover constructed in accordance with one form of the invention comprises a side plate 1 formed to substantially cover the outer side wall A of a spare tire B and also arranged to extend inwardly to overlie the spare wheel C as far as its hub cap D. The side plate 1 is preferably formed of sheet metal but may be formed of any other suitable material which will retain its shape. An outer ring 2 also preferably formed of sheet metal is constructed to extend across the entire tread B' of the spare tire B and to overlap the outer peripheral margin 3 of the side plate 1, said margin being preferably provided with a cushioning strip 4 to prevent rattling between the parts 1 and 2. The ring 2 is split and preferably resilient so that it not only holds itself on the tire but acts to force the side plate 1 toward and into hugging relation to the side wall of the tire.

The side plate 1 is provided preferably with co-axial circumferential corrugations 5 to improve the same aesthetically, and may be somewhat dished at 6 as shown in Figures 2 and 3. The plate 1 is formed at its inner periphery with a return bent flange 7 to provide a circumferential outwardly opening groove or pocket 8. The diameter of the inner periphery 9 of the side plate 1 is preferably substantially the same as that of the opening 10 in the hub E of the wheel C, for receiving the hub cap D.

An adapter 11 in the form of a split ring or collar is employed for releasably securing the plate 1 in centered relation to the wheel C and tire B. To this end, the collar 11 has a skirt 12 arranged to fit in the hub opening 10 and engage the hub E as shown in Figures 2 and 3. The skirt 12 is bulged at 13 to a diameter normally greater than that of the opening 10 so that it is necessary to apply force in an axial direction in order to move the bulged portion 13 into and out of the opening 10. The collar 11 is formed adjacent the skirt 12 with a radially inwardly opening channel 14, the free flange 15 of which has a normal inside diameter which is less than the diameter of the edge of the flange 7.

The flange 15 is positioned in the recess 8 by a resilient snap action as by first expanding the ring 11 so that its free flange 14 can pass beyond the edge of the flange 7 and into the pocket 8. The collar 11 may be placed in position with respect to the side plate 1 in a different manner, as by first assuming a spiral shape, slightly expanding the same to allow one end of the flange 14 to fit into the pocket 8, and working the remainder of the flange 14 by force over the flange 7 and into the pocket 8.

The collar 11 is constructed to resiliently engage the edge of the flange 7 of the side plate 1 to thereby prevent rattling between these parts, and the material comprising the ring 11 is made sufficiently resilient to allow its bulged portion 13 to be cammed inwardly by the rim of the hub opening 10 when the ring is applied to and removed from the hub E. The bulged portion 13 is preferably engaged by the hub rim on the side facing the channel 14 when the outer portion of the side plate 1 is substantially engaged with the side wall A of the spare tire B so that rattling between the ring 11 and the hub E will be prevented.

If desired, the collar can be made in a continuous ring and in such event the flange 7 of the cover member 1 could be made originally substantially cylindrical and thence spun into the channel of the collar. After the collar is placed in proper relationship to the side plate 1, a further connecting means between these parts may be dispensed with, or if desired, the engaging flanges 7 and 14 may be connected by welding, riveting or the like. Moreover, to facilitate the connecting and disconnecting of the collar with the hub E, the bulged portion 13 may be formed with a series of slots 15a as shown in Figure 5.

The centering collar 11a in accordance with a further form of the invention, as shown in Figures 6 and 7, may be formed with an extension 16 at one end arranged to be lapped under the other end of the collar as shown in Figure 6. The free margin of the skirt 17 of this construction has a lip or flange 18 as shown in Figures 6 and 7, forming at one end a guide for the other end whereby spiralling of the collar is prevented while relative circumferential movement of said ends is permitted.

In the form of the invention appearing in Figure 8, the collar 11b has the free margin of its skirt 23 curled into a substantially cylindrical bead 19 which securely receives a rod or wire 20 at one end 21 of the collar and telescopically receives the rod or wire 20 at the other end 22 of the collar. This construction is also advantageous in preventing spiralling of the skirt 23 while at the same time permitting the skirt to be snapped beyond the rim of the hub opening 10 in the application and removal of the side plate 1. The bead 19 may extend throughout the length of the collar 11b or may be provided only at the ends of the collar. This may also be true of the lip portions 18 in Figures 6 and 7.

The lip 18 and bead 19 extend radially outwardly short of the outermost peripheries of the skirts 17 and 23, respectively, so as not to interfere with the proper engagement between the respective skirts and the rim of the hub opening 10 during the application and removal of the side plate in connection with the spare wheel.

The space between the spring elements F and the outer periphery G of the hub cap D is provided to accommodate the inner peripheral edge 9 of the side plate 1, the skirt H of the hub cap having its outside diameter substantially equal to that at the periphery 9 and also that at the rim of the hub opening 10. Thus the hub cap D fits snugly into the opening bounded by the peripheral edge 9, the spring elements F being cammed inwardly and then allowed to snap into the channel 14 of the collar 11 as shown in Figure 3.

When the side plate 1 is not applied to the spare wheel, the hub cap D fits snugly in the opening 10, the fingers F engaging within the hub E just beyond the rim of the opening 10.

When it is desired to use the spare tire in running the car, the tread covering member 2 is first removed. The outer peripheral portion 3 of the side plate 1 is then grasped by the hands at spaced points and pulled away from the tire, thereby forcing the bulged portion of the skirt of the centering collar 11 to yield inwardly of the hub E and move out of the hub opening 10 until the side plate and associated parts are entirely free of the spare wheel and tire. A substantially axial force may be then applied to the hub cap D to cause the fingers F to be forced radially inwardly by the inner peripheral portion 9 of the side plate 1, until the hub cap D is entirely free of the side plate 1. The spare wheel and tire are now ready to be applied in operative position, and the hub cap can be snapped onto the hub E in the same manner in which the cap is placed in the side plate 1 as explained above. It will be obvious from the foregoing how the parts may be placed on the spare tire and wheel, when the wheel is not to be used to support the car.

In the form of the invention shown in Figures 10 to 13, the side plate 24 is independent of the hub and hub cap. In this form, the side plate 24 extends radially inwardly substantially to the outer periphery of the adjacent portion of the hub E' and is provided with a laterally extending inner peripheral flange 25 which projects toward the median plane of the tire when the side plate is in proper protecting relation to the tire and wheel. The side plate 24 at its outer periphery is constructed substantially the same as the side plate 1 and cooperates with the tread covering ring 2 in substantially the same way.

Secured to the inner peripheral portion 25 by welding or any other suitable means at 26ª is a plurality of spring fingers 26 carrying at their free ends 27 resilient rubber feet or pads 28. When unstressed, the fingers are so arranged that the pads 28 extend radially inwardly of the outer surface 29 of the adjacent portion of the hub E'. When it is desired to apply the side plate 24, it is necessary merely to arrange the same in co-axial relation to the spare wheel hub E' and then move the plate toward said hub. As this movement is continued, the feet 26 are cammed radially outward by the outer rounded edge 30 of the hub and slide onto the surface 29 until the plate 24 is substantially in engagement with the spare tire B. The radial pressure now exerted by the fingers 26 serves to hold the feet 28 in tight frictional engagement with the surface 29, thereby yieldably resisting removal of the plate 24 and properly supporting and centering the side plate 24 on the spare wheel. It has been found that three or four fingers 26 may be used advantageously, although any other number may be employed if desired. The feet or buttons 28 may be made of any other suitable material instead of rubber, or the spring fingers 26 may be entirely coated with rubber or the like for this purpose. The fingers 26 are preferably sufficiently narrow to fit between adjacent spokes of a wire or wood wheel.

In the form of the invention appearing in Figures 14 and 15, the tire cover side plate 31 is provided with an integral adapter collar 32 comprising a castellated skirt having a plurality of fingers or prongs 33 and intervening spaces 34. The material of which the plate 31 is made is preferably resilient, and each prong 33 preferably centrally thereof has a cam shaped outwardly extending projection 35. The cams 35 are arranged so that their radially outermost portions lie in a circle of normally greater diameter than that of the opening 10 in the wheel hub E.

The fingers 33 are yieldable as above pointed out, and the side plate 31 is applied to the hub E by being moved axially thereof, the rim of the opening 10 engaging the cams 35 and forcing the same radially inward until the portions of the cams 35 of maximum diameter are reached, and coming finally to a rest at some point between the portions of maximum diameter of each cam 35 and the body of the plate 31 as shown in Figure 15. The particular position occupied finally by the hub E with respect to the prongs 33 will depend upon the width of the tire carried by the wheel, since the outer peripheral portion of the side plate 31 engages the outer sidewall of the tire when the cover is in proper tire protecting position. The side plate 31 is shown in cooperative relation to the hub cap D in Figure 15.

As in the case of the hub previously described, the hub cap D is provided with a plurality of spring fingers F which are arranged to project into the spaces 34 as shown in Figure 15, and it will be noted that the spaces 34 are substantially wider than the fingers F to obviate the need for accuracy of alignment of the fingers F with the spaces 34 when the hub E is to be assembled with the side plate 31. Each finger F is preferably substantially cone shaped and is so arranged that it resiliently engages the free edge 36 of the narrow strip 37 between adjacent prongs 33 when the hub cap D is assembled with the side plate 31 as shown in Figure 15. Thus rattling between the parts is prevented, and assembly and disassembly of the parts is facilitated.

The side plate 31 is preferably formed by blanking out an annulus 31ª as shown in Figure 14, the inner periphery being formed with alternating projections 33ª and slots 34ª, and the projections 33ª being formed with protruding or bulged portions 35ª. The portion of the annulus 31ª at its inner periphery is then turned by spinning or die operations to form a generally cylindrical skirt as shown generally at 32 in Figure 15, the remaining portion of the annulus 31ª being formed with corrugations of annular form as indicated at 38 in Figure 15. If desired, the cams 35 may be formed in the prongs 33 after the latter are turned into the formation shown in Figure 15.

The form of the invention as shown in Figure 16 embodies the salient features of the forms shown in Figures 3 and 15. In Figure 16, the adapter collar 39 is in split circular form and is provided with a plurality of ribs or outwardly protruded cam portions 40 which cooperate with the hub E. The cam portions 40 are substantially identical with the cam portions 35 and cooperate with the hub E in substantially the same way. The tire cover side plate 41 is of a construction similar to the plate 1 in Figure 3 but has its inner peripheral margin 42 return bent into engagement with the body thereof. The inner peripheral edge 43 thus formed is preferably of a standard diameter for a predetermined range of hub cap sizes, so that the plate 41 may accommodate the different sizes of hub caps D within the said ring, even though the clearance between the periphery 43 and the neck D' varies. The flange 44 of the adapter 39 is arranged to engage the return bent margin 42 and to extend inwardly to substantially the neck D' of the hub cap D, at the same time preferably engaging the spring pressed finger F when the parts are assembled to prevent rattling there-between. The plate 41 accordingly fits between the hub cap D and the adapter 39 and is firmly held in position, the adapter 39 in turn being resiliently held in the hub E as shown in Figure 16. Since the hub sizes for any given range will not ordinarily vary in excess of about one-eighth of an inch in radius, any eccentricity that might occur between the side plate 41 and the hub cap D will be so slight that it will not be ordinarily perceptible without measurement.

In the forms of the invention shown in Figures 15 and 16, it will be understood that the spring pressed fingers F are arranged to snap into the opening 10 in the hub E.

In the form of the invention appearing in Figure 17, a multi-part side plate construction is employed, the arrangement being such that the side plate will be supported in proper protecting relation to the outer side of the tire and associated wheel by the engagement of its outer periphery with the inner surface of the tread covering split ring 2, the parts cooperating substantially as shown in Figures 1, 2, 10 and 11. In this form of the invention, the construction is similar to that in Figure 16 except that the adapter 39 is omitted, the same being replaced by a resilient split ring 45 which cooperates with the return bent inner peripheral margin 42 and the spring pressed fingers F in substantially the same manner in which the flange 44 of the adapter 39 in Figure 16 cooperates with these parts. The side plate 41, the hub cap D and the resilient split ring 45 are assembled and disassembled in the same manner in which the corresponding parts of Figure 16 are assembled and disassembled and serve, when the tire cover is in proper tire protecting position, to conceal the entire outer side of the wheel and supported tire.

The forms of the invention appearing in Figures 15 and 16 are desirable for the reason among others that the reduced amount of contact necessary between the adapter and the hub E through the employment of the cam portions or ribs facilitates the connection and separation of these parts and further for the reason that only a small part of the outer surface of the adapter will be marred by engagement with the hub E. Although four fingers 33 are shown in the form of the invention appearing in Figures 14 and 15, obviously the number may be varied as desired, and this is true also of the number of cam ribs employed in the forms shown in Figures 14, 15 and 16.

It will be observed that the centering collar or adapter 39 in Figure 16 is resilient and is so constructed that it will fit in various sizes of hub openings and accommodate itself to the corresponding variation in hub cap dimensions. Any contraction of the skirt portion of this collar will produce a corresponding contraction in the flange thereof, and accordingly a number of variations in diameters can be accommodated with the one size of collar or adapter.

If desired, slots can be punched or otherwise formed in the prongs 33 on the form of the invention shown in Figure 15 for the reception of the spring fingers F in the event that such fingers are so spaced or arranged that they cannot be snapped into the spaces 34.

It will be appreciated that each of the foregoing constructions is quite simple, involving few parts which may be formed by simple manufacturing operations at low cost. Each of the constructions appearing in Figures 1 to 16 inclusive, is such as to appreciably facilitate the application of a cover of the general character embodying a side plate and a tread covering member to and removal from a spare tire carried on a wheel, since it makes possible such application to or removal from a tire mounted either at the rear or along a side of a car where there is no interference with the center. That is, each of the parts comprising the side plate and outer ring in said figures may be applied and removed individually without any attention being required by the other parts, the side plate holding itself in position regardless of the presence or absence of the outer ring.

I am aware that many changes may be made and numerous details of construction may be varied through a wide range without departing from the principles of this invention, and I, therefore, do not purpose limiting the patent granted hereon otherwise than necessitated by the prior art.

I am aware that many changes may be made and numerous details of construction may be varied through a wide range without departing from the principles of this invention and I, therefore, do not purpose limiting the patent granted hereon otherwise than necessitated by the prior art.

I claim as my invention:

1. A cover for a spare wheel and tire, said cover comprising a plate-like member of annular formation and extending from the tread of the tire to the hub of the wheel, and a spring pressed attaching fitting connected to said member in coaxial relation thereto and arranged to yieldably grip the hub so that the latter will center and support the member.

2. In combination with a spare wheel carrying a spare tire, a cover comprising a member for covering a side wall of the tire and having a central opening of substantially the same diameter as the adjacent opening in the wheel hub, whereby the cap normally fitted into the hub opening may be fitted into the plate opening, and a yieldable skirt extending from said plate adjacent its opening and arranged to snap into the hub opening to thereby support said plate and cap.

3. In combination with a spare wheel carrying a spare tire, a cover comprising a member for covering a side wall of the tire and having a central opening of substantially the same diameter as the adjacent opening in the wheel hub, whereby the cap normally fitted into the hub opening may be fitted into the plate opening, a yieldable split collar extending from said plate adjacent its opening and arranged to snap into the hub opening to thereby support said plate and cap, and means for preventing disalignment of the ends of the collar.

4. As an article of manufacture, a connector comprising a split ring-like member including a channel and a skirt, one end of the member having a projection and on the other end an opening circumferentially aligned with and at all times telescopically receiving said projection, whereby relative lateral movement between the ends of the member is prevented.

5. In combination with a spare wheel carrying a spare tire, a cover comprising a member for covering a side wall of the tire and having a central opening of substantially the same diameter as the opening in the wheel hub, whereby the cap normally fitted into the hub opening may be fitted into the plate opening, and a yieldable skirt extending from said plate at its opening and having a plurality of circumferentially spaced cams arranged to snap into the hub opening to thereby support the plate and cap centrally of the hub.

6. A cover for a spare tire and wheel, said cover comprising a plate-like member of substantially annular formation and having at its inner periphery a flexible skirt, for fitting in the hub of the wheel, said skirt being provided with circumferentially spaced projections for spacing the remainder of the skirt from the hub when the skirt is fitted thereto, said projections being arranged to yieldably grip the hub so that the latter will center and support the member.

7. A tire cover construction comprising an annular plate-like member having at its inner periphery a castellated skirt, and a closure for the plate opening, said closure comprising a cap having a flange engageable with said plate adjacent said opening to conceal the same from one side of the plate, and a neck for fitting within said skirt and provided with radially extending spring pressed fingers engageable in the slots of the castellated skirt to connect the plate and cap in releasably assembled relation against rattling.

8. A tire cover construction comprising an annular plate-like member having at its inner periphery a castellated skirt, and a closure for the plate opening, said closure comprising a cap having a flange engageable with said plate adjacent said opening to conceal the same from one side of the plate, and a neck for fitting within said skirt and provided with radially extending spring pressed fingers engageable in the slots of the castellated skirt to connect the plate and cap in releasably assembled relation against rattling, said skirt being resilient whereby the same may frictionally engage in a wheel hub to thereby support the tire cover member in centered relation to a wheel.

9. In combination in a spare wheel assembly, a spare tire and wheel including a central wheel hub and a hub cap for cooperation therewith, a circular fitting in telescoping cooperation with the wheel hub and having an outer opening of a size to receive a part of said hub cap, and a spare tire cover including a ring-like side portion for disposition over a side of the tire and wheel and having its inner marginal edge interlocked with the hub cap disposed in engagement with said fitting, said inner marginal edge being clampingly engaged by the peripheral rim of the hub cap so that said side portion is centrally clamped to the wheel.

ARTHUR P. FERGUESON.